United States Patent
Harral et al.

(10) Patent No.: US 7,930,254 B1
(45) Date of Patent: Apr. 19, 2011

(54) PROPERTY VALUE ESTIMATION USING FEATURE DISTANCE FROM COMPARABLE SALES

(75) Inventors: Brian D. Harral, Crofton, MD (US); John M. Ashley, Alexandria, VA (US)

(73) Assignee: Fannie Mae, Washington, DC (US)

( * ) Notice: Subject to any disclaimer, the term of this patent is extended or adjusted under 35 U.S.C. 154(b) by 1134 days.

(21) Appl. No.: 11/197,517

(22) Filed: Aug. 5, 2005

(51) Int. Cl.
*G06Q 50/00* (2006.01)

(52) U.S. Cl. ....................................... 705/313

(58) Field of Classification Search ...................... 705/1
See application file for complete search history.

(56) References Cited

U.S. PATENT DOCUMENTS

| | | | |
|---|---|---|---|
| 5,361,201 A | 11/1994 | Jost et al. | |
| 5,893,069 A | 4/1999 | White, Jr. | |
| 6,401,070 B1 | 6/2002 | McManus et al. | |
| 6,510,419 B1 | 1/2003 | Gatto | |
| 6,609,109 B1 | 8/2003 | Bradley et al. | |
| 6,609,118 B1 | 8/2003 | Khedkar et al. | |
| 6,681,211 B1 | 1/2004 | Gatto | |
| 6,842,738 B1 | 1/2005 | Bradley et al. | |
| 6,876,955 B1 | 4/2005 | Fleming et al. | |
| 7,729,965 B1 * | 6/2010 | An et al. | 705/35 |
| 7,822,691 B1 * | 10/2010 | Kuo | 705/313 |
| 2001/0039506 A1 * | 11/2001 | Robbins | 705/10 |
| 2002/0059126 A1 | 5/2002 | Ricciardi | |
| 2002/0087389 A1 * | 7/2002 | Sklarz et al. | 705/10 |
| 2003/0046099 A1 * | 3/2003 | Lamont et al. | 705/1 |
| 2003/0046199 A1 | 3/2003 | Murase et al. | |
| 2003/0078878 A1 | 4/2003 | Opsahl-Ong | |
| 2004/0010443 A1 | 1/2004 | May et al. | |
| 2005/0187778 A1 * | 8/2005 | Mitchell | 705/1 |

OTHER PUBLICATIONS

Aalberts, Robert J.; Bible, Douglas S., Appraisal Journal ? v60n4 ?pp. 483-492, Oct. 1992 CODEN: APPJA5 ISSN: 0003-7087 ?Journal Code: APJ Document Type: Journal article ?Language: English ?Length: 10 Pages.*
Applicant's Remarks dated Sep. 13, 2010.*
Archer, W.R. et al., "Measuring the Importance of Location in House Price Appreciation", *J. of Urban Economics*, vol. 40, 1996, pp. 334-353.
Case, K.E. & Shiller, R.J., "Forecasting Prices and Excess Returns in the Housing Market", *J. of the Areuea*, 1990, 18(3), pp. 253-273.
Abraham et al., "New Evidence on Home Prices from Freddie Mac Repeat Sales". Journal of the American Real Estate & Urban Economics Association, Fall 1991, vol. 19, Issue 3, pp. 333-352.

(Continued)

*Primary Examiner* — Jamisue A Plucinski
*Assistant Examiner* — Matthew Sittner
(74) *Attorney, Agent, or Firm* — Rader, Fishman & Grauer PLLC (57) ABSTRACT

Property value estimation employs a comparable sales technique that calculates a feature distance between a target property and corresponding comparable properties. Determining estimated values for properties includes performing a regression based upon property features for properties in a relatively large geographical area. A set of comparable properties from a section of the relatively large geographical area is identified, and a feature distance between each property from the set of comparable properties and a target property is calculated using information from the regression. The feature distance provides a quantified indication of the difference between each property from the set of comparable properties and the target property for the plurality of property features. An estimated value for the target property is then determined based upon a value of each of the comparable properties and adjustments based upon the calculated feature distances.

21 Claims, 3 Drawing Sheets

OTHER PUBLICATIONS

Raftery, A. et al., "Model Selection and Accounting for Model Uncertainty in Linear Regression Models", Nov. 19, 1993, U of Washington, pp. 1-24.

Vandell, K.D., "Optimal Comparable Selection and Weighting in Real Property Valuation", Areuea Journal, vol. 19(2), 1991, pp. 213-239.

Stephens, W. et al. "Conventional Mortgage Home Price Index", J. of Housing Research, vol. 6(3), pp. 389-418.

Case, K.E. & Shiller, R.J., "The Efficiency of the Market for Single-Family Homes", The American Economic Review, vol. 79(1), Mar. 1989, pp. 125-137.

Pace, R.K. & Gilley, O.W., "Appraisal Across Jurisdictions Using Bayesian Estatemation with Bootstrapped Priors for Secondary Mortgage Market Applications", *Prop. Tax J*, Mar. 1989, 8 (1), pp. 27-42.

Gearge W. Gau et al., "Optimal Comparable Selection and Weighting in Real Property Valuation: An Extension" (Journal of the American Real Estate and Urban Economics Association 1992, V20, 1: pp. 107-123.

Sessions, D.N. & Chatterjee, S., "The Combining of Forecasts Using Recrursive Tecniques With Non-Stationary Weights", *J. of Forecasts*, 1989, 8(3), pp. 239-251.

Case, K.E. & Shiller, R.J., "Prices of Single-Family Homes Since 1970:New Indexes for Four Cities", New England Economic Review, Sep./Oct. 1987, pp. 45-46.

Case, B. & Quigley, J.M., "The Dynamics of Real Estate Prices", *Rev. of Econ. & Stats.*, Feb. 1991, 73(1), pp. 50-58.

Quigley, J.M., "A Simple Hybrid Model for Estimating Real Estate Price Indexes", *J. Houseing Econ.*, Mar. 1995,4 (1), pp. 1-12.

Steven Wood "Combining Forecasts to Predict Property Values for Single-Family Residences" Land Economics, May 1976, pp. 221-229.

Case et al., "On Choosing Among House Price Index Methodologies", Journal of the American Real Estate & Urban Economics Association, vol. 19, No. 3,1991, pp. 286-307.

Andrews, R.L.& Ferguson,J.T., "Integrating Judgement with Regression Appraisal",*Real Estate Appraiser and Analyst*, Spring 1986, pp. 71-74.

"Free Home Real Estate Market Value Price for Your House or Property", www.housevalues.com, p. 1, 2005.

"Electronic Appraiser", www.eletronicappraiser.com, pp. 1-8, 2005.

"Public Records Online Directory", http://www.netronline.com/public_records.htm, pp. 1-2, 2005.

"What Is My Home Worth", Realty Trac, www.realtytrac.com pp. 1-2, 2005.

* cited by examiner

PROPERTY VALUE ESTIMATION USING FEATURE DISTANCE FROM COMPARABLE SALES

BACKGROUND OF THE INVENTION

1. Field of the Invention

This invention relates generally to property value estimation and more particularly to using feature distances between a target property and comparables to estimate the target property value.

2. Description of the Related Art

In various real estate related businesses, it is known to estimate for the fair market value of a property at a point in time based on the observed sales amounts of similar properties in the same geographic market. This may be referred to as estimation based upon comparable properties, or comparable sales.

Conventional processes in this area are carried out in several ways. One technique is performed by human appraisers who look at records of property sales, generally by ZIP code, and select a set of properties that are believed to be similar. They then apply their judgment to adjust the value of the observed sales by the set of observed characteristics of the sale (square footage, yard, etc.) and then present these sales and adjustments to define a range of likely values.

A second approach uses automated appraisal systems that define study groups based upon jurisdictionally provided boundaries, property features and observed sales records. Regression is applied to estimate the change to a prior appraisal amount over the study group and that percentage is applied equally to all homes in the study group.

Still another technique uses automated appraisal tools that perform regression based on property characteristics, and weight that prediction with some number of recent comparable sales based on either ZIP code adjacency or by using a GIS to define concentric circles to restrict the sales records used.

The first method is not automated and is reliant upon various subjective factors as well as the experience of the appraiser. The second relies on the accuracy of the prior assessment, as well as the provided boundaries, and does not generate customized value estimates for each property. The third implements overly simple models of housing valuation, such as dollars per square foot, and can be computationally expensive when run on large datasets.

What is needed is a computationally efficient appraisal technique that accommodates calculation with large datasets, that diminishes reliance upon the accuracy of prior assessments, and that accommodates customized value estimates.

SUMMARY OF THE INVENTION

The present invention provides improved property value estimation by employing a comparable sales technique that calculates a feature distance between a target property and corresponding comparable properties.

According to one aspect, determining estimated values for properties includes performing a regression based upon a plurality of property features for properties in a relatively large geographical area. A set of comparable properties from a section of the relatively large geographical area is identified, and a feature distance between each property from the set of comparable properties and a target property is calculated using information from the regression. The feature distance provides a quantified indication of the difference between each property from the set of comparable properties and the target property for the plurality of property features. An estimated value for the target property is then determined based upon a value of each of the comparable properties and adjustments based upon the calculated feature distances.

According to another aspect, the feature distances that are calculated are independent of the physical distance between the target property and the comparable properties. This is, a distance between properties in feature space, rather than mere physical space provides the quantified indication of the difference between the target and comparable property.

According to another aspect, the regression is used to determine coefficients that correspond to each of the plurality of property features. The feature distance between a target property and a comparable property is then calculated using the coefficients, the property features for the target property, and property features for the comparable property.

According to another aspect, determining the estimated value comprises determining a weighted average of the list of comparable properties wherein the feature distance between each property from the set of comparable properties and the target property is used to determine the weight for each property.

According to still another aspect of the present invention, an adaptive grid is determined for the relatively large geographical area. The adaptive grid contains a plurality of cells, with each grid cell having spatial boundaries that are independent from established boundaries in the large geographical area, and with the spatial boundaries being flexibly definable to accommodate each grid cell having a desired density of comparable property sales. The adaptive grid is used in identifying the set of comparable properties.

According to still another aspect, partitioning into sub-markets accommodates additional accuracy in property value estimation. The may involve partitioning properties in the relatively large geographical area into a plurality of sub-markets, such that performing the regression and determining the set of comparable properties are done for individual ones of the plurality of sub-markets.

The present invention can be embodied in various forms, including business processes, computer implemented methods, computer program products, computer systems and networks, user interfaces, application programming interfaces, and the like.

BRIEF DESCRIPTION OF THE DRAWINGS

These and other more detailed and specific features of the present invention are more fully disclosed in the following specification, reference being had to the accompanying drawings, in which.

DETAILED DESCRIPTION OF THE INVENTION

In the following description, for purposes of explanation, numerous details are set forth, such as flowcharts and system configurations, in order to provide an understanding of one or more embodiments of the present invention. However, it is and will be apparent to one skilled in the art that these specific details are not required in order to practice the present invention.

Figure 1:
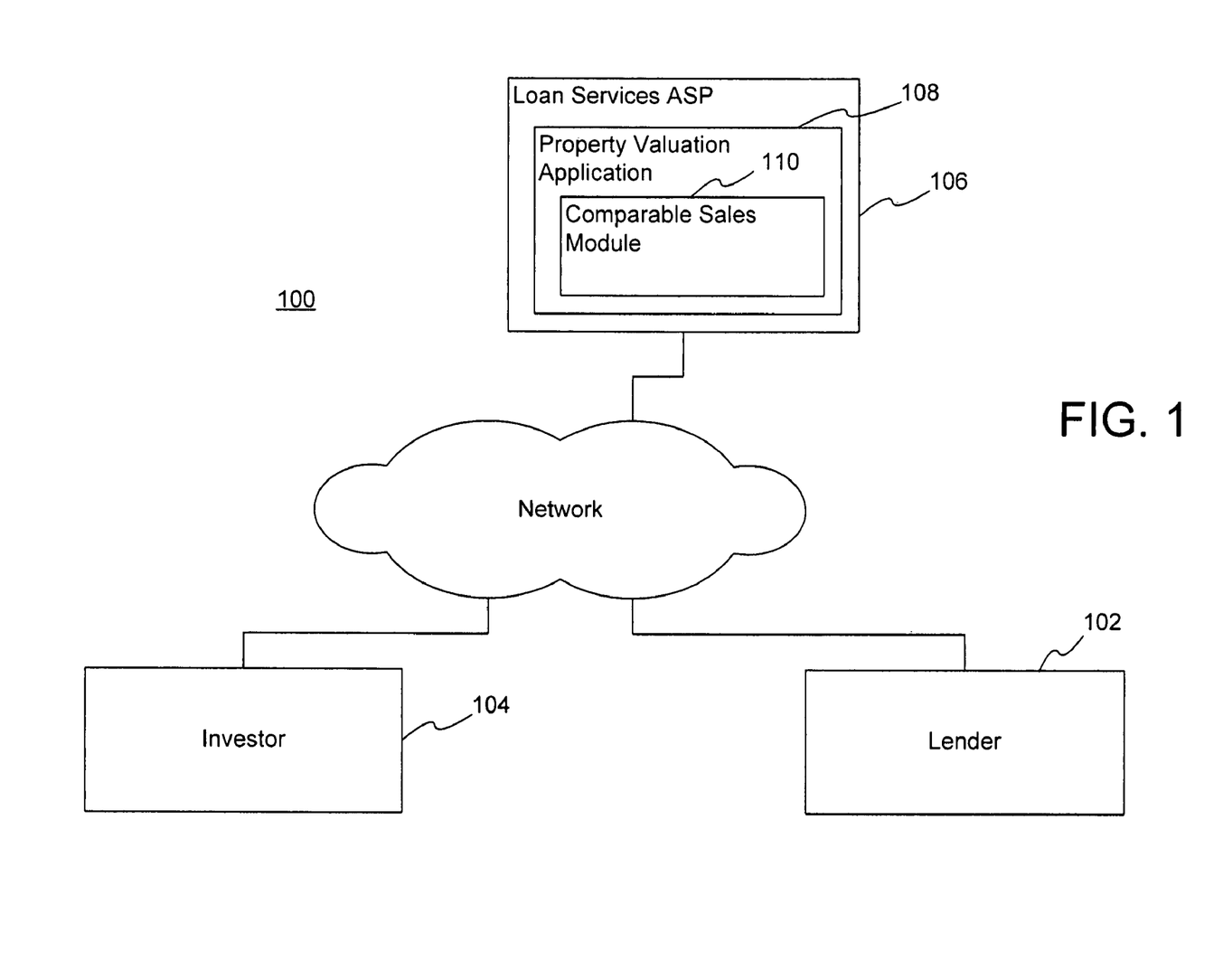
FIG. 1 is a schematic diagram illustrating a system in which property value prediction with automatic comparable sales determination may be provided in accordance with the present invention.

FIG. 1 is a schematic diagram illustrating a system 100 in which property value prediction with automatic comparable sales determination may be provided in accordance with the present invention. The system 100 includes a lender 102, investor 104 and loan services ASP 106. Each of these entities 102-106 comprises a computer system configured to provide the functionality described herein. The lender 102, investor 104 and loan services ASP 106 can be interconnected by a public network such as the Internet, and they can variously communicate using conventional architectures and protocols, such as according to a client server model implementing the TCP/IP communication protocol suite. Alternatively, a private network, a combination of public and private networks, wireless networks, or any conventional arrangement for conducting communications to accommodate the described functionality may be provided.

The entities 102-106 may also implement various technologies and protocols for transmitting, accessing, displaying, printing, or otherwise processing information. For example, browser based systems implementing HTML may be used to accommodate the display of information panels and corresponding solicitation and receipt of information used in providing estimated property values. Various additional technologies may also be used to accommodate the sharing of data, such as XML (or as applied using XHTML). Although these examples of technology are described, the present invention is not so limited and may implement any communication, data sharing, or other technology that has been or will be developed.

The loan services ASP 106 also includes a property valuation application 108 that further includes a comparable sales module 110. Conventional browsing allows the lender 102, investor 104 or other client computer (e.g., appraiser, homeowner, potential purchaser, etc.) to interact with the loan services ASP 106 and allow provision and receipt of the property valuation functionality described herein.

The property valuation application 108 includes interfaces that allow users to input information that identifies a target property for which a predicted value is requested, and interfaces that provide users with corresponding estimated values corresponding to the requests, or other types of reports such as lists of comparables and corresponding adjustments.

The comparable sales module 110 employs a comparable sales technique as described herein. The comparable sales technique has various features that allow efficient processing of large datasets while providing individual estimates of value for each included property.

One useful feature is the definition and usage of a feature space independent of physical distance between properties or the actual time difference between sales (although allowances for geospatial and temporal correlation may be mapped into the feature space). This allows fast and efficient selection of similar properties and sales records, and directly supports the estimation of adjustment factors.

Coupled with inclusion of the estimated impact of the spatial and temporal cohort characteristics rather than the actual characteristics, the present invention preferably accommodates division of the market into smaller segments (e.g., small, medium, and large properties in a four factor model and small-new, small-old, large-new, large-old in a two factor model, infra). Even if the design heuristics do not result in statistical homoskedasticity, they segregate the various factors influencing the underlying distribution and render the statistical and procedural techniques more accurate and reliable than they would otherwise be.

Another useful feature is the implementation of an adaptive grid. In place of the traditional exact distance measurement or creation of a ZIP or Census tract-based adjacency matrix, the present invention preferably employs a computationally efficient adaptive grid that combines the spatial characteristics of the county with the density of sales to allow fast formation of cohorts of properties satisfying an approximate physical distance condition that also ensures, on average, a sufficient number of sales records in the comparable pool to allow calculation of an estimate of value.

Still another useful feature is a system of adaptive temporal bins that define variable duration temporal cohorts to support retrospective analysis of comparables in two modes: a "what an appraiser could have known then" or pure retrospective mode; and a "using every bit of information we possess, what is the best estimate" or oracular retrospective mode.

Although the combination of features described above has been found to be useful for comparable sales determination and corresponding property value estimation, the present invention is not necessarily limited to embodiments that include all of the features.

The described system 100 is one example of an environment in which embodiments of the present invention may operate. Alternative environments including but not limited to providing software on a desktop computer for direct (in lieu of network) user access to property value estimation may also be provided in accordance with the present invention.

Figure 2:
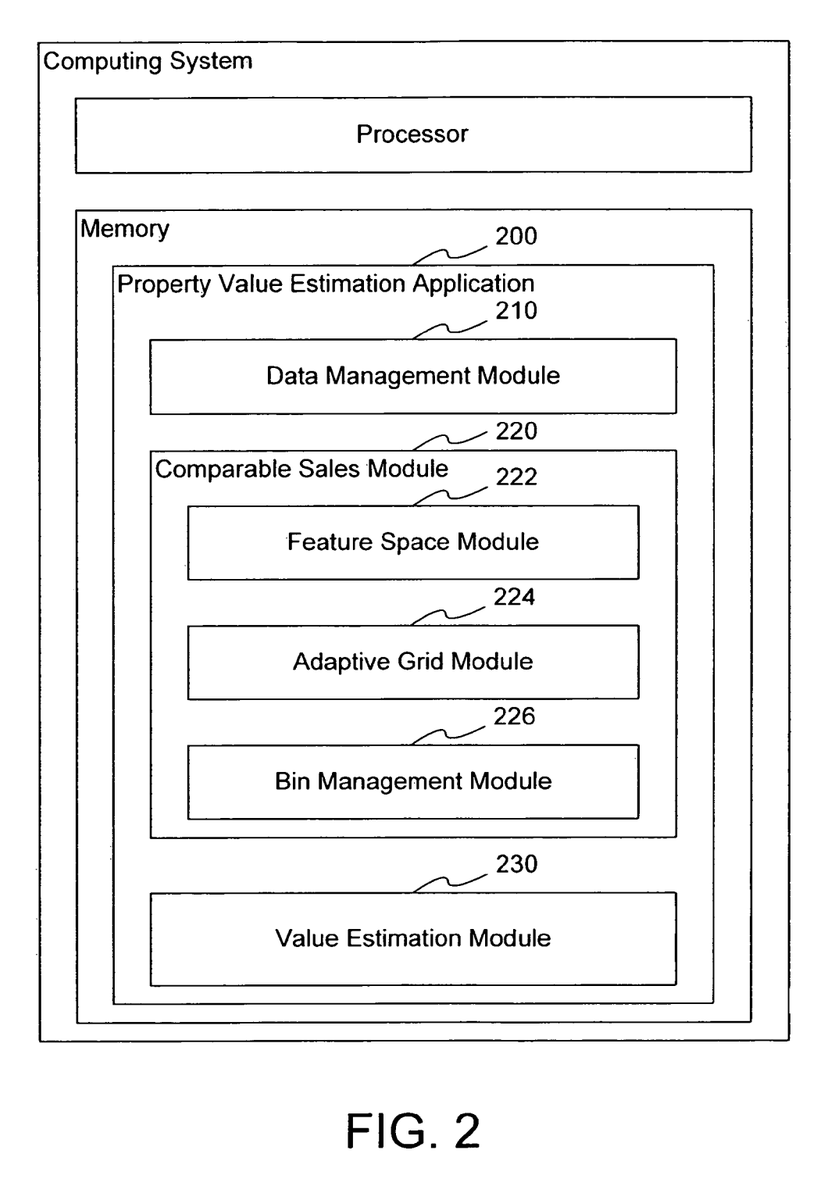
FIG. 2 is a block diagram illustrating a property value estimation application with a comparable sales module in accordance with the present invention.

FIG. 2 is a block diagram illustrating an embodiment of a property value estimation (PVE) application 200 with a comparable sales module 220 in accordance with the present invention.

The PVE application 200 runs on a conventional operating system in memory and carries out the described functionality by execution of computer instructions. The artisan will readily recognize the various alternative programming languages and execution platforms that are and will become available, and the present invention is not limited to any specific execution environment.

Although the PVE application 200 is preferably provided as software, it may alternatively be hardware, firmware, or any combination of software, hardware and firmware. Although one modular breakdown is described, such is provided by way of example only, as the functionality of the PVE application 200 may be provided in any number of alternative designs having greater, fewer or differently named component modules.

In one embodiment, a computer system includes the PVE application 200 resident in memory on a conventional computer system, with the PVE application 200 including instructions that are executed by a processor. Alternative embodiments include an article of manufacture wherein the instructions are stored on a computer readable storage medium. The medium may be of any type, including but not limited to magnetic storage media (e.g., floppy disks, hard disks), optical storage media (e.g., CD, DVD), and others. Still other embodiments include computer implemented processes described in connection with the PVE application 200 as well as the corresponding flow diagrams.

The PVE application 200 includes a data management module 210, a comparable sales module 220 and a value estimation module 230. The data management module 210 accommodates the receipt and management of large datasets comprising property sales records and related property information. The property information includes features such as lot size, home size, number of bath rooms, age and location.

The data may originate from various conventional sources such as public records, privately managed records, and combinations thereof.

The comparable sales module 220 communicates with the data management module 210 and thereby accesses the property information. The comparable sales module 220 includes a feature space module 222, adaptive grid module 224 and bin management module 226.

The feature space module 222 prepares the data and preferably performs a regression on the property characteristics pursuant to the generation of county level coefficients which are in turn used to determine weighting factors that are applicable to comparable properties.

The adaptive grid module 224 uses the spatial characteristics at the county level along with an identification of the density of sales to accumulate cohorts of properties that are respectively within cells in the adaptive grid. The adaptive grid includes cells that are not rigidly fixed to delineated boundaries. Rather, location information and the density of sales are used to ensure that the properties within grid cells are sufficient in number so that comparable pools may be built in support of the calculation of accurate value estimations.

The bin management module 226 accommodates the building of bins of properties according to the adaptive grid. A bin basically corresponds to a grid cell from the adaptive grid. Comparable lists are built from properties within a given bin. The bin management module 226 is configured to apply spatial characteristics in building such bins. It may also be configured to apply temporal characteristics.

The functionalities of the feature space module 222, adaptive grid module 224 and bin management module 226 are described further in connection with the following flow diagram.

The value estimation module 230 is in communication with the data management module 210 and the comparable sales module 220. The value estimation module 230 uses the information to calculate an estimated property value for a target property. Preferably, this is done by accessing a list of comparables, calculating a feature distance between the target property and each of the comparables and making corresponding adjustments, and calculating an adjusted weighted comparable sales average corresponding to the target property.

Figure 3:
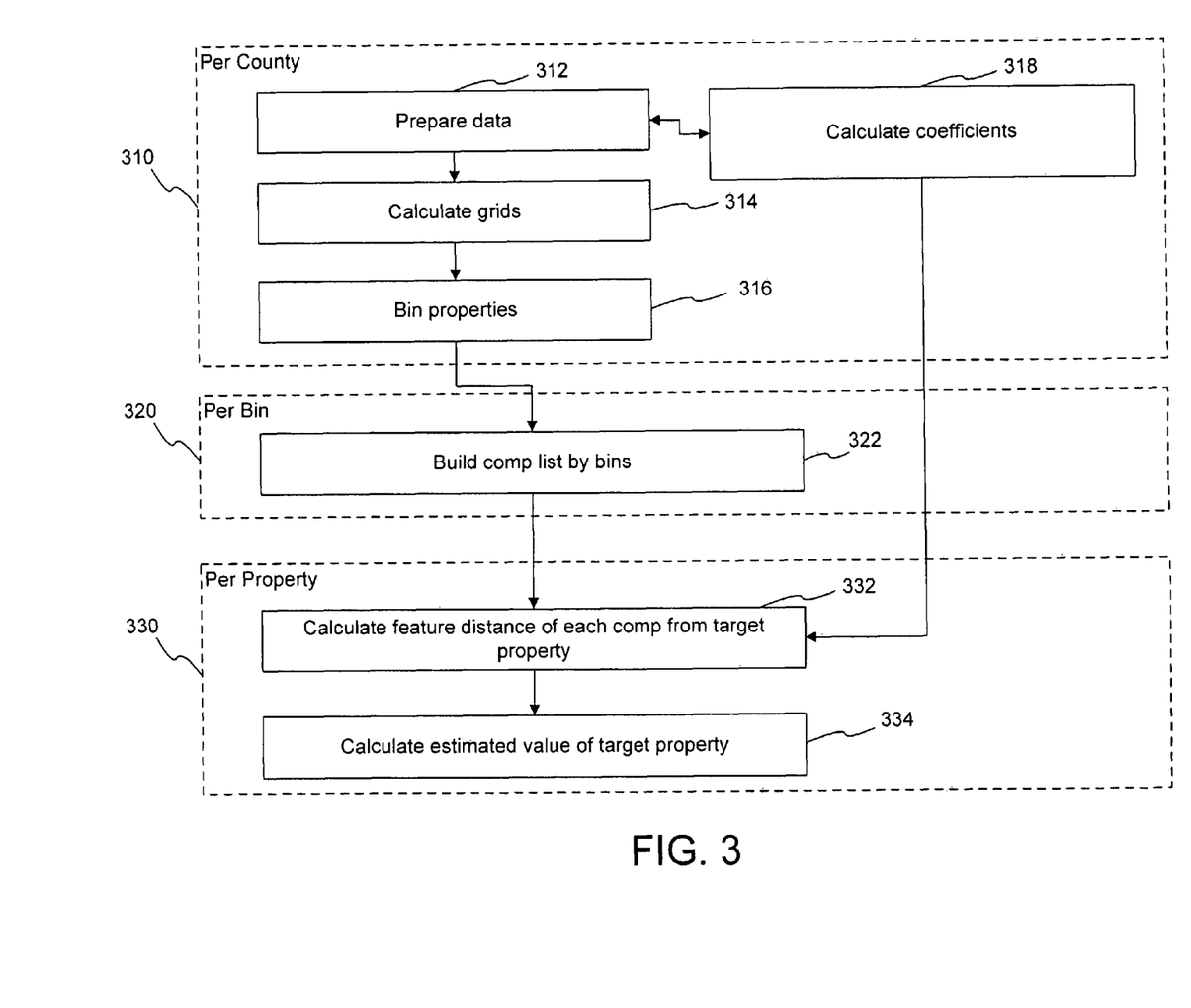
FIG. 3 is a flow diagram illustrating an embodiment of a process for property value estimation with comparable sales determination in accordance with the present invention.

FIG. 3 is a flow diagram illustrating an example of property value estimation with comparable sales determination process 300 in accordance with the present invention. The process includes per county 310, per bin 320 and per property 330 components.

Before moving to the description at the per county 310 level, it is noted that the process 300 may be part of one that performs calculations over a geographical area encompassing many different counties. In that case, a large dataset (e.g., nationwide) may be partitioned into counties (e.g., using the county code corresponding to records in the dataset). It is also noted that a county is one example of a relatively large geographical area over which calculation of adjustment factors may be determined.

At the county level, data is prepared 312, the adaptive grids are calculated 314 and the properties are binned 316. Regression coefficients are also preferably calculated 318 at the relatively large geographical area (e.g., county) level.

Data preparation 312 may include augmenting and filtering of data. Augmentation is done in support of the regression that will be applied to the data. For example, it may include provision of a natural log of the assessed amount, square footage, lot size, and age of each property in the dataset. There may be instances where data is missing, which may merit removal of the record, or an adjustment based upon whatever is absent. Filtering entails removal of undesired records, such as refinance records (whose values are considered less reliable than purchase transactions) or removal of any record for which a sale amount is unavailable.

Regression coefficients are calculated 318 using linear regression, with outliers being discarded. The regression is preferably performed on (categorical) census tract, sales quarter, and numerical property characteristics in a mixture of log and normal space. In a four factor approach, the property characteristics may include ln(square feet), ln(lot size), ln(age), and number of baths. The regression produces coefficients (e.g., $C_{SF}$, $C_{LS}$, $C_{AGE}$ and $C_{NB}$) respectively corresponding to the relevant features (e.g., square footage, lot size, age and number of baths).

The regression coefficients may be scaled such that a given property value difference (e.g., 10%) correlates to one unit of distance in the feature space. This provides regression coefficients that scale to the same shift in price. Although 10% is preferred, the designer is free to choose any desired amount or percentage.

The regression may also be repeated a number of times to increase the accuracy of the results, with points that overly influence the regression being discarded. In such instances, there may be additional filtering of data between regression iterations. Any desired number of iterations may be used, typically based upon a balancing of desired accuracy and required execution time. Three iterations have been found sufficiently accurate without unduly consuming processing resources.

Geographic areas may also be partitioned into sub-markets pursuant to data preparation 312 and calculation 318 of the regression coefficients. Although housing markets are often thought of as being defined by a locale, there are definite sub-markets based on economic and social characteristics of home buyers. It has been determined that it is useful to divide the housing market in each geographic area up into sub-markets based on the housing characteristics in the geographic area—the values of the regression coefficients can be significantly different in each sub-market.

In a four factor model (square footage, age, lot size, and number of bathrooms), a model defining small, medium, and large housing submarkets appears to more accurately reflect observed housing prices. Small may be defined as having square footage less than or equal to an adaptive cutoff (e.g., the 33rd percentile of observed square footage). Likewise, medium is larger than small but less than another cutoff (e.g., the 66th percentile); and large is greater than that cutoff (e.g., larger than the 66th percentile). Market crossover weighting functions may also be used to modify the results of the distance function and mark to target predictions.

In a two factor model (square footage, age), it is believed that partitioning the market into submarkets first by size—small being less than or equal to the median square footage and large being greater than the median square footage—may still be insufficient. Accordingly, there can be further partitioning of each of the size submarkets into age based submarkets—old being greater than the median age of observed properties and new being less than or equal to the median age. In this case each submarket contains ¼ of the data.

As a preliminary step in grid calculation 314, a time horizon is set to accommodate the generation of a sufficient number of comparables. The time horizon may also be adjusted for areas. For example, an area with low recent sales may warrant a relatively long time horizon. Preferably, at least one year's worth of data is used to avoid the introduction of seasonal effects.

An adaptive temporal bin technique may also be applied. In a pure retrospective mode, where only information that would have been available to an appraiser at the time of the sale is used, the temporal cohort of the comparables is defined to be the quarter of the sale and the three prior quarters to the point of the sale or such time greater than four quarters as is needed to accumulate sufficient comparable sales for estimation of the necessary parameters. In an oracular retrospective mode, the best possible information is used to determine a fair market value. This includes future sales information that would not have been available to an appraiser. The temporal cohort of the comparables is defined to be the quarter of the sale, the quarter following the sale, and the two quarters prior to the sale; if additional quarters of sales information are needed to accumulate sufficient comparable sales then additional quarters are added at each end until there are sufficient comparable sales to estimate the necessary parameters.

The grids may then be calculated 314 using heuristics on the minimum and maximum number and size of the grids plus the number of projected sales to produce a grid that has a desired number of sales per grid cell (e.g., approximately 20 average sales per grid cell). Alternatively, the grid cell may be set to a given size and a formula such as a coarse grained Cartesian distance formula may be used to define the grid.

The properties are binned 316 by grid cell, according to the calculated 314 grid. Since the adaptive grid conforms to the earth, a simple latitudinal and longitudinal comparison allows placement of properties into bins, in lieu of a more complicated spatial comparison.

Comparable lists are then built 322 on a per-grid cell basis. Particularly, iteration through cohorts formed by comparable sales within a grid cell and its neighboring grid cells may be used to build 322 the comparable lists. The comparable list for grid cell (x,y) is the set of all properties with projected comparable sales in grid cells (a,b) where $x-1 <= a <= x+1$ and $y-1 <= b <= y+1$. Alternatively, computation may work outward from the central grid cell in square rings until a threshold of comparables is reached.

Calculation 332 of the feature distance of each comparable from a target property may then be performed pursuant to calculating 334 the estimated value of the target property. The feature distance is preferably calculated using the weights determined at the county level corresponding to various features such as lot size, square footage, age, and number of bathrooms. The features of the target property and those of the comparable property, along with the respective coefficients accorded to those features are used to determine the feature distance. For example, the ratio of the lot sizes and the coefficient for lot size determines the contribution of the lot size feature to the overall feature distance. There may also be instances where an absolute difference of a feature value between the target and the comparable property are used in lieu of the ratio of features. For example, the absolute difference in the number of baths has been found to be more useful than a ratio of the same.

The feature distance provides a cumulative numerical value that allows corresponding adjustment. A feature distance of "0" means that the properties have identical features. If desired, an adjustment term based on physical proximity may also be introduced. Where certain feature values are absent from the available data, consideration of that feature may be omitted from the calculation of the feature distance. However, a confidence measure may also be calculated where this is the case, based upon the determined relative importance of the absent feature. Equation 1 below may be used to calculate the feature distance:

$$FD_{ij} = 10 * \sqrt{\left(\left(\frac{\frac{SF_j - SF_i}{\sqrt{(SF_j^* SF_i)}}}{C_{SF}}\right)^2 + \left(\frac{\frac{LS_j - LS_i}{\sqrt{(LS_j^* LS_i)}}}{C_{LS}}\right)^2 + \left(\frac{\frac{AGE_j - AGE_i}{\sqrt{(AGE_j^* AGE_i)}}}{C_{Age}}\right)^2 + \left(\frac{NB_j - NB_i}{C_{NB}}\right)^2 + (TRACT_j - TRACT_i)^2 + (Q_j - Q_i)^2\right)}$$

(Eq. 1), where $C_{SF}$, $C_{LS}$, $C_{AGE}$ and $C_{NB}$ are the above-described coefficients; $SF_j$, $LS_j$, $AGE_j$ and $NB_j$ are the features for target property j; $SF_i$, $LS_i$, $AGE_i$ and $NB_i$ are the respective features for the i comparable properties; and TRACT, Qi and Qj are census tract effects and quarterly effects that are calculated in the above-described regression.

For any given comparable i, the weight may then be calculated as:

$$w_i = \frac{1}{FD_{ij} + C_D}, \quad \text{(Eq. 2)}$$

where $FD_{ij}$ the feature distance between target property j and comparable property i, and $C_D$ is a number that is used to avoid a divide-by-zero error (it may be arbitrary or set to a ratio of 1 over the maximum weight that could be accorded to an identical property).

The estimated value of the target property is then calculated 334. This is basically a "mark to target" operation that is performed to adjust the values of the comparables. It is preferably a weighted average using the feature distance and (if applicable) confidence metrics to yield an estimate for the target property. The following equation may be used to calculate an estimated value $\hat{S}$ for the property:

$$Ln(\hat{S}_{prop}) = \frac{\sum_{i=comps} w_i \left(S_i \left(1 + C_{SF}\left(\frac{SF_j - SF_i}{\sqrt{(SF_j * SF_i)}}\right) + C_{LS}\left(\frac{LS_j - LS_i}{\sqrt{(LS_j * LS_i)}}\right) + C_{Age}\left(\frac{AGE_j - AGE_i}{\sqrt{(AGE_j * AGE_i)}}\right) + C_{NB}(NB_j - NB_i) + (TRACT_j - TRACT_i)^2 + (Q_j - Q_i)^2\right)\right)}{\left(\sum_{i=comps} w_i\right)} \quad \text{(Eq. 3)}$$

The estimated values of properties may be variously used. Uses include but are not limited to estimating a value of a property pursuant to an appraisal, a purchase or sale of a property, a purchase or sale of a mortgage corresponding to a property, and various other uses involving property value estimation. The output may also be in the form of a listing of comparables and the amount of adjustment that was applied. In addition to being useful for property value estimation, the present invention may be useful in the detection of poor or fraudulent appraisal patterns.

Thus embodiments of the present invention produce and provide property valuation that employs a comparable sales determination process. Although the present invention has been described in considerable detail with reference to certain embodiments thereof, the invention may be variously embodied without departing from the spirit or scope of the invention. Therefore, the following claims should not be limited to the description of the embodiments contained herein in any way.

The invention claimed is:

1. A computer implemented method for determining estimated values for properties, the method comprising:
    performing, by a computer, a regression based upon a plurality of property features for properties in a relatively large geographical area and determining coefficients that correspond to each of the plurality of property features based upon the regression;
    identifying, by a computer, a set of comparable properties from a section of the relatively large geographical area;
    calculating, by a computer, a feature distance between each property from the set of comparable properties and a target property using the coefficients from the previously performed regression, the feature distance providing a quantified indication of the difference between each property from the set of comparable properties and the target property for the plurality of property features, wherein the feature distances are independent of the physical distance between the target property and the comparable properties; and
    determining, by a computer, an estimated value for the target property based upon a value of each of the comparable properties and adjustments based upon the calculated feature distances.

2. The method of claim 1, further comprising:
    using the values for the plurality of property features for the target property, and values for the plurality of property features for each property from the set of comparable properties to calculate the feature distances.

3. The method of claim 2, wherein the plurality of property features include square footage, lot size, number of baths, and age.

4. The method of claim 2, wherein the plurality of property features include square footage and age.

5. The method of claim 1, further comprising:
    determining an adaptive grid for the relatively large geographical area, the adaptive grid containing a plurality of grid cells, with each grid cell having spatial boundaries that are independent from established boundaries in the large geographical area, and with the spatial boundaries being flexibly definable to accommodate each grid cell having a desired density of comparable property sales; and
    using the adaptive grid in identifying the set of comparable properties.

6. The method of claim 5, wherein using the adaptive grid in identifying the list of comparable properties comprises:
    identifying a given grid cell in the adaptive grid corresponding to the target property;
    building the set of comparable properties based upon membership in the given grid cell and a number of grid cells that are adjacent to the given grid cell.

7. The method of claim 1, wherein determining the estimated value comprises:
    determining a weighted average of the list of comparable properties wherein the feature distance between each property from the set of comparable properties and the target property is used to determine the weight for each property.

8. The method of claim 1, further comprising:
    partitioning properties in the relatively large geographical area into a plurality of sub-markets, such that performing the regression and determining the set of comparable properties are done for one of the plurality of sub-markets.

9. The method of claim 1, further comprising:
    using an adaptive temporal bin technique to accumulate sufficient comparable property sales prior to identifying the set of comparable properties.

10. The method of claim 9, wherein the adaptive temporal bin technique implements a retrospective mode, wherein the temporal cohort of comparable property sales is defined to include sales from a number of quarters prior to a given sale quarter corresponding to the target property.

11. The method of claim 9, wherein the adaptive temporal bin technique implements an oracular mode, wherein the temporal cohort of comparable property sales is defined to include sales from before and after a given sale quarter corresponding to the target property.

12. A system for determining estimated values for properties, the system comprising:
    means for performing a regression based upon a plurality of property features for properties in a relatively large geographical area and means for determining coefficients that correspond to each of the plurality of property features based upon the regression;
    means for identifying a set of comparable properties from a section of the relatively large geographical area;
    means for calculating a feature distance between each property from the set of comparable properties and a target property using coefficients from the previously performed regression, the feature distance providing a quantified indication of the difference between each property from the set of comparable properties and the target property for the plurality of property features, wherein the feature distances are independent of the physical distance between the target property and the comparable properties; and
    means for determining an estimated value for the target property based upon a value of each of the comparable properties and adjustments based upon the calculated feature distances.

13. The system of claim 12, further comprising:
    means for using the values for the plurality of property features for the target property, and values for the plurality of property features for each property from the set of comparable properties to calculate the feature distances.

14. The system of claim 12, further comprising:
    means for determining an adaptive grid for the relatively large geographical area, the adaptive grid containing a plurality of grid cells, with each grid cell having spatial boundaries that are independent from established boundaries in the large geographical area, and with the spatial boundaries being flexibly definable to accommodate each grid cell having a desired density of comparable property sales; and means for using the adaptive grid in identifying the set of comparable properties.

15. The system of claim 14, wherein the means for using the adaptive grid in identifying the list of comparable properties identifies a given grid cell in the adaptive grid corresponding to the target property, and builds the set of comparable properties based upon membership in the given grid cell and a number of grid cells that are adjacent to the given grid cell.

16. The system of claim 12, wherein the means for determining the estimated value determines a weighted average of the list of comparable properties wherein the feature distance between each property from the set of comparable properties and the target property is used to determine the weight for each property.

17. A computer readable medium having program code stored thereon for determining estimated values for properties, the program code being executable by a processor to perform operations comprising:

performing a regression based upon a plurality of property features for properties in a relatively large geographical area and determining coefficients that correspond to each of the plurality of property features based upon the regression;

identifying a set of comparable properties from a section of the relatively large geographical area;

calculating a feature distance between each property from the set of comparable properties and a target property using the coefficients from the previously performed regression, the feature distance providing a quantified indication of the difference between each property from the set of comparable properties and the target property for the plurality of property features, wherein the feature distances are independent of the physical distance between the target property and the comparable properties, wherein the feature distances are independent of the physical distance between the target property and the comparable properties; and determining an estimated value for the target property based upon a value of each of the comparable properties and adjustments based upon the calculated feature distances.

18. The computer program product of claim 17, wherein the operations further comprise:

using the values for the plurality of property features for the target property, and values for the plurality of property features for each property from the set of comparable properties to calculate the feature distances.

19. The computer program product of claim 17, wherein the operations further comprise:

determining an adaptive grid for the relatively large geographical area, the adaptive grid containing a plurality of grid cells, with each grid cell having spatial boundaries that are independent from established boundaries in the large geographical area, and with the spatial boundaries being flexibly definable to accommodate each grid cell having a desired density of comparable property sales; and using the adaptive grid in identifying the set of comparable properties.

20. The computer program product of claim 19, wherein using the adaptive grid in identifying the list of comparable properties identifies a given grid cell in the adaptive grid corresponding to the target property, and builds the set of comparable properties based upon membership in the given grid cell and a number of grid cells that are adjacent to the given grid cell.

21. The computer program product of claim 17, wherein determining the estimated value determines a weighted average of the list of comparable properties wherein the feature distance between each property from the set of comparable properties and the target property is used to determine the weight for each property.

* * * * *